April 7, 1953 J. MERCIER 2,634,387
SYNCHRONOUS SERVO-CONTROL
Filed Feb. 24, 1949

INVENTOR:
JEAN MERCIER
BY
Richardson, David and Nordon
ATTY'S

Patented Apr. 7, 1953

2,634,387

UNITED STATES PATENT OFFICE 2,634,387

SYNCHRONOUS SERVO-CONTROL

Jean Mercier, New York, N. Y.

Application February 24, 1949, Serial No. 78,030
In Belgium February 27, 1948

2 Claims. (Cl. 318—30)

The present invention relates to those servo-controls which enable any two phenomena to be synchronised, and in particular the displacement of a driven or controlled member and of a reference member executing any movement.

The servo-control according to the invention comprises a source of energy designed to actuate the driven member, a principal distributor controlling this source, and preferably a pilot distributor, directly or indirectly controlling the said source of energy, this drive being characterized by the fact that the distribution of the energy is controlled not only by the phase displacement or shift in position between the two phenomena but also by at least one of the derivatives of this shift with respect to time.

In other words, the opening of the pilot distributor is a function of the shift and of the relative velocity of the two phenomena, acting in such a manner that it will be the algebraic sum of these two factors that determines the action upon the said pilot distributor.

Provision is particularly made for servo-controls of this type in which no mechanical subjection in position is provided between the pilot distributor and the main distributor of motive power.

It will be understood that this will obviate the necessity, and even the utility, of the corrections that have hitherto been necessary with devices comprising a subordination of the pilot distributor to the main distributor, which enabled beats to be avoided, but had on the contrary the disadvantage of creating shifts as a function of the velocity of the system under consideration, the return shifting necessitating particular arrangements which are in this way eliminated.

According to another feature of the invention the action upon the pilot distributor, on the occasion of each acceleration or retardation of the member constituting the standard of reference, takes place in three stages.

First, the phase difference and the difference of speeds act in the same sense, so as to bring together as quickly as possible the two members to be synchronised;

Then, when the two speeds become equal, the phase difference alone continues to act upon the pilot distributor;

Finally, when the speed of the driven member, which has a parabolic aspect, exceeds the speed of the reference member, the action upon the pilot distributor due to the differences between the speeds acts in the opposite sense to that due to the phase restoration in position, so as to preponderate when the separation becomes sufficiently small to involve a risk of beats, whence it results that the curve of displacement of the driving member as a function of the time does not practically or appreciably intersect the corresponding curve of the standard of reference, thereby obviating the said beats.

According to one form, the phenomenon of beats which are due to the inertia of the driven apparatus admitting of being expressed by the product of the mass of the driven member by the square of the speed of the displacement divided by two, the arrangement made is such that the main correction introduced by the first derivative with respect to time will be a function of the second degree.

The invention will be better understood by the aid of the accompanying drawing, in which certain forms of construction are illustrated by way of example. In the drawing.

Figure 1:
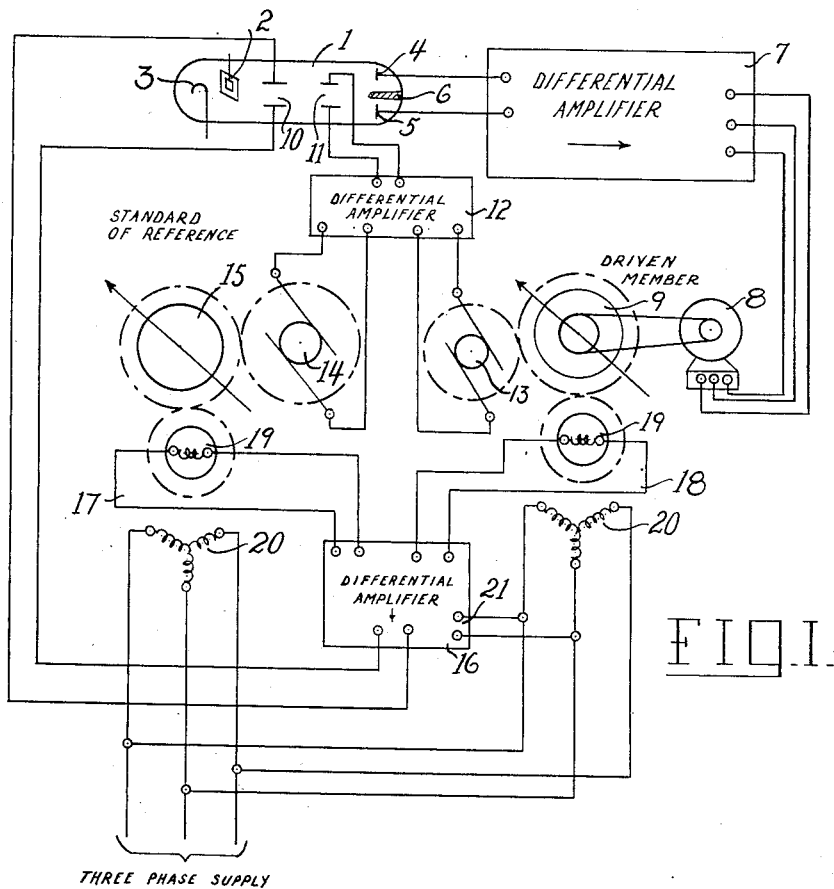
Figure 1 is a diagrammatic view showing one form of construction involving electrical means.

Referring first to Figure 1, 1 is a cathode ray tube, 2 its anode, and 3 its cathode. A rectilinear cathode beam is thus directed along the tube, in the opposite end of which are arranged two spaced detectors or collector plates 4 and 5, between which a screen 6 is provided. Currents furnished by the two detectors are amplified in an amplifier 7, the amplified current feeding an electric motor 8, which is thus set in rotation in one direction or the other according as the current furnished by one detector or the other preponderates. The motor 8 actuates the driven member 9.

In the cathode tube 1 are also provided two pairs 10 and 11 of electrostatic deflection plates, arranged in the path of the cathode rays. The terminals of the pair 11 are connected to the terminals of an amplifier 12, which is fed on the one hand by a generator 13 driven by the member 9, and on the other hand by a generator 14 driven by the standard of reference 15. It will be understood that the voltage across the terminals of the pair 11 will be determined by the difference between the voltages furnished by the two generators 13 and 14, these voltages being functions of the speeds of the members 9 and 15. When these speeds are equal, the plates are not subjected to any voltage difference, whereas the slightest difference between the speeds of these mmbers, subjects the pair of deflection plates 11 to a voltage, which deflects the beam of cathode rays from its normal path in one direction or the other, so that it acts upon the corresponding detector, and gives to the member 9 a supplementary torque, designed to take up the aforesaid difference in speed. This system therefore takes into account the difference in speed between the two members.

The second pair of deflection plates 10 is connected to the terminals of a synchro-differential amplifier 16, fed by two selsyns 17 and 18, the former of which expresses the position of the reference member 15, and the latter that of the driven member 9.

The selsyns 17 and 18 are each shown provided with the usual three phase stator winding 20 and a rotor winding 19. The stator windings are shown connected to the same three phase supply so that their revolving fields will always be in predetermined fixed angular relationship. The two rotors 19 are connected to a differential amplifier 16 which has a pair of terminals 21 connected to one phase of the three phase supply in order that the differential amplifier may sense the direction of any difference voltage between the two rotors. Such a difference voltage produced by any relative angular displacement between the two rotors, thus produces an output potential of appropriate polarity depending upon the direction of such displacement, and this output potential is applied to the deflection plates 10 which control the motor 8 in the proper sense to correct such angular displacement.

Thus the slightest discrepancy (phase displacement) between these two members determines a difference of potential at the terminals of the pair deflection plates 10, which consequently deflects the cathode beam away from its normal path, so that it acts upon the detectors 5 and 6 in such a way as to communicate to the member 9 a corresponding supplementary movement in one direction or the other.

Each of the three amplifiers 7, 12 and 16 may consist in known manner of a two-grid amplifier tube whose grids are arranged differentially so that the output current results from the amplification of the current representing the difference between the two input currents.

It will be understood that the system illustrated in Figure 1 enables control to be exercised not only as a function of the shift in position between the two phenomena, but also as a function of a derivative of this phase shift in relation to time, that is to say, of the relative speed.

Figure 2:
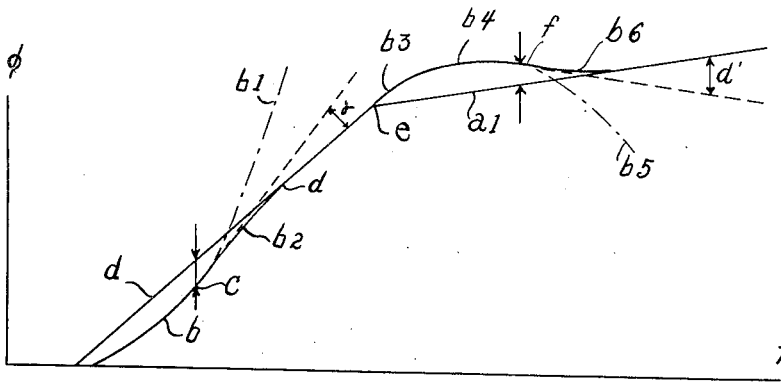
Figure 2 is a diagram showing curves of displacement of the standard of reference and of the driven member.

Referring to Figure 2, the broken line $a, d, e, a_1$ shows the motion of the standard of reference, and the curve $bc, b_2, d, e, b_3, b_4, f, b_6$ the motion of the driven member. This motion is here expressed as the variation of an angle $\phi$ plotted against time. Assuming that the standard of reference has taken up a certain speed, and that the driven member is accelerated to enable it to overtake the standard of reference, it will be understood that the driven member will move along a curve of parabolic form. When the driven member arrives at the point $b$, at which its speed is equal to that of the standard of reference, the action due to the difference in speed is completed. When the driven member reaches the point $c$, that is to say, when its speed has exceeded the speed of the standard of reference, the device according to the invention intervenes to diminish its speed, in such a way that instead of following the branch $b_1$ of the curve it will follow the line $b_2$, which will tend to become tangential to the line $a$, the angle $a$ between the tangent to the curve $b$ and the straight line $a$, representing the difference between the speeds, tending progressively to diminish. Starting from the point $d$, at which the curve $b_2$ has become merged in the straight line $a$, the two members move without relative angular displacement. It will now be assumed that at the point $e$ the standard of reference has undergone a retardation. From this point onwards it will then follow the straight portion $a_1$, while the driven member will continue to move along the straight portion $b_3$. At this juncture a retardation is applied to the driven member and it will consequently follow a curve $b_4$ of parabolic form. When it reaches the point $f$, its speed having become lower than the speed of the standard of reference, an acceleration will again be imparted to it, so that instead of following the branch $b_5$ it will follow the curve $b_6$, the angle $a'$ between the straight portion $a_1$ and the tangent to the curve $b_4$ diminishing progressively until the two trajectories merge into one.

It will be understood that the invention is in no way restricted to the forms of construction described and illustrated, and that it may be embodied in many other forms that will be obvious to those skilled in the art, without going outside its ambit, or departing from its spirit.

I claim:

1. A servo-control for controlling the position of a controlled member in dependence upon the position of a reference member, including a straight cathode tube, means at one end of the tube emitting cathode rays in the longitudinal direction of the tube, two detectors at the other end of the tube, arranged one on each side of the axis of the tube, means for amplifying the electric currents obtained from the detectors, an electric motor, energised by the currents so amplified, and actuating the controlled member, two pairs of electrostatic deflecting plates so arranged in the cathode tube that the beam passes between the plates of each pair, means for applying to the plates of one pair a voltage determined by the difference between the speeds of the reference member and the controlled member, and means for applying to the plates of the other pair a voltage determined by the difference in position between the reference member and the controlled member.

2. A follow up system for controlling the position of a controlled member in dependence upon the position of a controlling member comprising means for generating an E. M. F. function of the difference in position between the controlling member and the controlled member, means for generating an E. M. F. function of at least one derivative of the displacements of said members with respect to time, a straight cathode tube, means at one end of said tube for emitting cathode rays in the longitudinal direction of said tube, two detectors at the other end of said tube, means arranged on each side of the axis of said tube and to which said E. M. F.'s are applied for deflecting said cathode rays towards one or the other of said detectors, means for amplifying the electric current resulting from the difference of the two electric currents generated by said two detectors respectively, and means for causing said amplified current to actuate said controlled member.

JEAN MERCIER.

REFERENCES CITED

The following references are of record in the file of this patent:

UNITED STATES PATENTS

| Number | Name | Date |
|---|---|---|
| 1,703,280 | Minorsky | Feb. 26, 1926 |
| 1,988,458 | Minorsky | Jan. 22, 1935 |
| 2,357,922 | Zieholz et al. | Sept. 12, 1944 |
| 2,408,813 | Riggs | Oct. 8, 1946 |
| 2,414,430 | Nisbet | Jan. 14, 1947 |
| 2,421,230 | Agins | May 27, 1947 |
| 2,434,189 | Ziebolz | Jan. 6, 1948 |
| 2,530,775 | Kliever | Nov. 21, 1950 |

OTHER REFERENCES

Ziebolz: "Analysis and Design of Translator Chains," vols. 1 and 2, published by Askania Regulator Company, Sept. 25, 1946.